June 2, 1959

W. E. INGHAM 2,889,473

SYNCHRONISING OF TWO TRAINS OF SIGNALS

Filed Sept. 26, 1956

Inventor
W. E. Ingham
By Glascock Downing & Seebold
Attys.

United States Patent Office 2,889,473
Patented June 2, 1959

2,889,473

SYNCHRONISING OF TWO TRAINS OF SIGNALS

William Ellis Ingham, Ealing, London, England, assignor to Electric & Musical Industries Limited, Hayes, Middlesex, England, a company of Great Britain Application September 26, 1956, Serial No. 612,243

Claims priority, application Great Britain September 29, 1955

9 Claims. (Cl. 307—149)

This invention relates to circuit arrangements for comparing the frequencies or phases of two signals, for example for synchronising said signals.

The need to synchronise two signals is frequently encountered in the television art, for example in so-called flywheel synchronising circuits and in synchronised detectors used in detecting chrominance signals in colour television receivers. To achieve such synchronisation it has been proposed to employ phase control circuits in a feedback loop, but conventional phase control circuits suffer from the disadvantage that if, on first switching on a receiver or on tuning it to another station, the frequency of the local oscillator differs from that of the incoming signals the local oscillator is pulled into step with the incoming signals only slowly if at all.

The object of the present invention is to reduce this disadvantage.

According to the present invention there is provided a circuit arrangement for comparing the frequencies or phases of two signals, comprising a network for producing frequency dependent phase shift, means for applying the first of said signals with a first polarity to a first point of said network with reference to a second point of said network, means for applying the other signal with a second polarity to said first point with reference to said second point, means for applying said first signal with said first polarity in push-push to said two points, means for applying the second signal with the reverse of said second polarity in push-push to said two points, and means for deriving an output signal in response to the resultant voltage difference between said points, whereby the magnitude and sign of said output signal represents the frequency or phase difference of said two signals.

As will appear from the following description, the invention leads to synchronising circuit which gives rapid pull in when the signals differ in frequency as well as when the signals differ in phase.

Figures 1, 2:
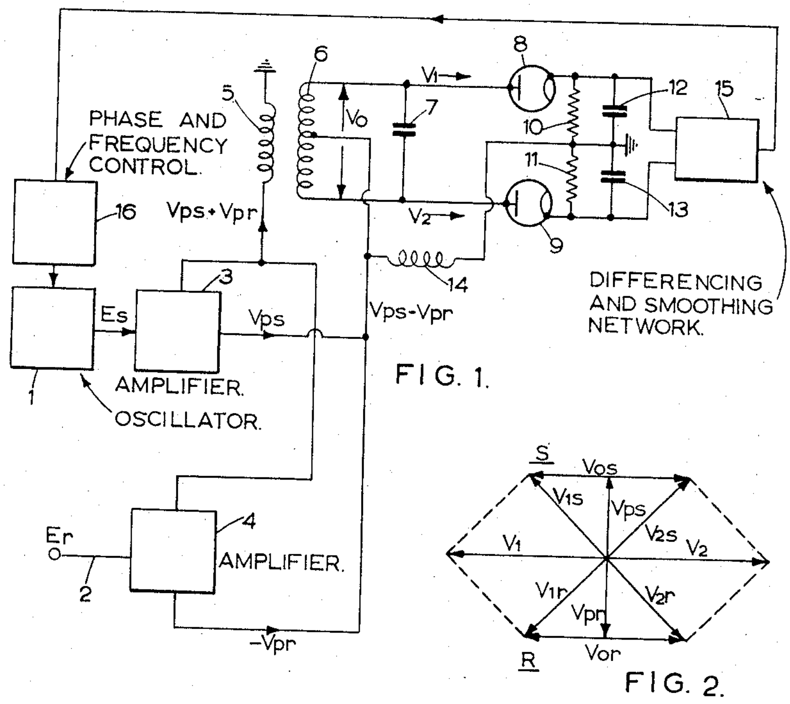

In order that the invention may be clearly understood and readily carried into effect, the invention will be described with reference to the accompanying drawings, in which:

Figure 1 illustrates one example of a synchronising circuit according to the invention, employing a discriminator of the Foster-Seeley type, and Figures 2 to 6 inclusive are vector diagrams which will be used to explain the operation of Figure 1.

Referring to Figure 1, the rectangle 1 denotes an oscillator, which may be of any suitable construction and which may be assumed to generate sinusoidal oscillations. The signal produced by the oscillator 1 is denoted as E*s*. Another sinusoidal signal E*r* is applied to terminal 2 and this will be assumed to be a reference oscillation and that the purpose of the arrangement to be described is to synchronise the signal E*s* in frequency and phase with the signal E*r*. The signals E*s* and E*r* are amplified in amplifiers 3 and 4 which are each arranged to set up two output signals corresponding to the respective input signal. The output signals of the amplifier 3 are denoted as V*ps* and they have the same polarity, whilst the output signals of the amplifier 4 are denoted as V*pr* and they have opposite polarities. These signals are fed to a discriminator circuit which comprises a primary inductor 5 relatively loosely magnetically coupled to a secondary induction 6 tuned by a capacitor 7 to a predetermined resonant frequency, which may be the nominal frequency of the reference signal E*r*. Opposite ends of the inductor 6 are connected to the anodes of two diode rectifiers 8 and 9, which may be crystal rectifiers or thermionic valve rectifiers as desired. The cathodes of the rectifiers 8 and 9 are connected by resistors 10 and 11, shunted respectively by capacitors 12 and 13 which are of relatively low impedance at the frequency of the reference signal E*r*. As indicated in the drawing, one output from the amplifier 3 is combined with one output from the amplifier 4 in the primary inductor 5 so that the current in this inductor corresponds to $Vps+Vpr$. The second outputs from the amplifiers 3 and 4 are injected at the midpoint of the inductor 6 so that there is applied in push-push to the end of the inductor 6 a voltage representing $Vps-Vpr$. Moreover, the mid-point of the inductor 6 is returned to the junction of the resistors 10 and 11 for direct and low frequency currents by way of a choke 14 the junctions of the resistors 10 and 11 being grounded. The voltages set up across the resistors 10 and 11 are applied to a differencing and smoothing network 15, which generates a voltage representing the smoothed difference of the two applied voltages. The voltage generated by the network 15 is applied to a phase and frequency control device denoted by the rectangle 16. This device may for example comprise a reactance valve coupled in the tank circuit of the oscillator 1. Since such devices are well known, the device 13 has merely been shown in block form. The network 15 may also be of well known construction is also shown in block form.

In explaining the operation of the circuit arrangement, it is convenient to consider separately the voltages induced in the discriminator circuit by the signals V*ps* and V*pr*. The amplifiers 3 and 4 are arranged so that the magnitudes of V*ps* and V*pr* are equal and therefore these signals induce equal-amplitude voltages, V*os* and V*or* respectively across the tuned secondary circuit 6, 7 of the discriminator, by virtue of the coupling to the inductor 5, the circuit 6, 7 being balanced as regards these voltages. The voltages applied across the rectifiers 8 and 9 are denoted respectively as V1 and V2 and it will be apparent that the voltage 1 is the vector sum of the voltages ½V*os*, ½V*or*, V*ps* and —V*pr*, similarly the voltage V2 is the vector sum of —½V*os*, —½V*or*, V*ps* and —V*pr*. It is also arranged that the magnitudes of V*os* and V*or* are twice the magnitudes of V*ps* and V*pr*.

Figure 2 depicts the operation of the circuit when the signals E*s* and E*r* have the same frequency and phase and when their frequency is the same as the resonant frequency of the circuit 6, 7. The components of V1 due to the signal E*s* is the vector sum of $Vps+\frac{1}{2}Vos$, and the component of V2 due to this signal is the vector sum of $Vps-\frac{1}{2}Vos$. Moreover the voltage V*os* is in phase-quadrature relationship with the voltage V*ps* due to the reactive coupling of the inductances 5 and 6. The vector diagram of the voltages in the discriminator circuit due to the signal E*s* forms the upper half of Figure 2 and will be referred to hereafter as the vector diagram S. The signal E*r* gives rise to a similar vector diagram, which forms the lower half of Figure 2 and is denoted by the reference R. It will be noted in Figure 2 that the vectors V*ps* and V*pr* have opposite senses. The voltage V1 is the vector sum of V1*s* and V1*r* (namely the vector sum of the components due to E*s* and E*r*), similarly the voltage V2 is the vector sum of V2*s* and V2*r* and it is clear from Figure 2 that these two vector sums are equal. Therefore no output voltage is generated by the network 15 to alter the frequency or phase of the oscillator 1.

Figure 3:
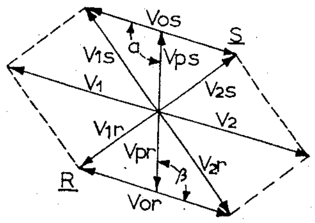

Figure 3 depicts the situation in which signals E*s* and E*r* are still equal in phase and frequency but in which their frequency is different from the resonant frequency of the circuit 6, 7. As is well understood in connection with Foster-Seeley discriminator circuits, the vectors V*os* and V*or* are no longer in phase quadrature with the voltage injected at the mid-point of the circuit 6, 7. In Figure 3 the phase angle between V*os* and V*ps* on the one hand and between V*or* and V*pr* on the other hand are indicated as alpha and beta, and since E*s* and E*r* have the same frequency, alpha and beta are equal. The components of V1 and V2 due to the signal E*s* are no longer equal as can be seen by comparing V1*s* and V2*s*. The same is true of the components V1*r* and V2*r* of the vector diagram R but the two resultant vectors V1 and V*r* are still equal. Therefore there is again no output potential to alter the frequency or phase of the oscillator 1.

Figure 4:
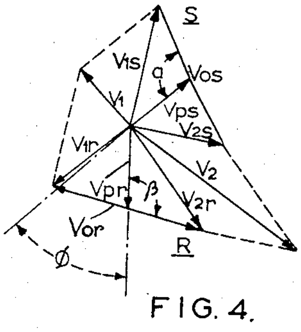

Figure 4 depicts the situation when the frequencies of the signals E*s* and E*r* are the same as for Figure 3 but in which the signals E*s* and E*r* have the phase difference phi between them. The components V1*s* and V1*r* of the voltage V1 are of the same magnitude as in Figure 3 and the same is true of the components V2*s* and V2*r*. However the vector diagram S has been rotated as a whole with respect to the diagram R through an angle phi. Consequently V1 which is the vector sum of V1*s* and V1*r* is of lesser magnitude than V1 in the case of Figure 3. Conversely V2 which is the vector sum of V2*s* and V2*r* is of greater magnitude than V2 for the case of Figure 3. By the action of the rectifiers 8 and 9 a control voltage is now generated by the network 15 which represents the difference between the magnitudes of V2 and V1 and this control voltage operates through the agency of the device 13 to alter the phase of the oscillator 1 until the desired phase equality is restored between the signals E*s* and E*r*. It will be noted that in Figure 4 the angles alpha and beta are still equal since the signals E*s* and E*r* have the same frequency.

Figure 5:
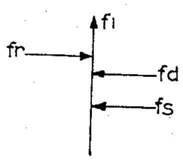
Figure 6A:
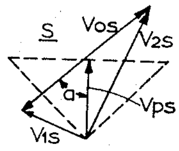
Figure 6B:
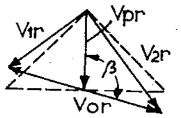

Figures 5 and 6 depict the situation when the signals E*s* and E*r* have different frequencies. Assume that the frequency *fr* of the signal E*r* is higher than *fd*, the resonant frequency of the circuit 6, 7, and the *fd* in turn is higher than the frequency *fs* of the signal E*s*. Assume also that *fr*—*fd* is less than *fd*—*fs*, as indicated in Figure 5. This is the most complex case which may arise and it will be evident that the following explanation can be applied, with appropriate simplification, to the case in which the discriminator is in tune so that *fr* is equal to *fd*.

Figures 6(*a*) and 6(*b*) show the vector diagrams S and R for the frequency situation shown in Figure 5. Because *fs* is less than *fd*, the vector V*os* is advanced with respect to the phase quadrature position, and because *fr* is greater than *fd*, the vector V*or* is retarded with respect to the phase quadrature position. Moreover the advance of V*os* is greater than the retardation of V*or* because the difference between *fs* and *fd* is greater than between *fd* and *fr*. Therefore the angle alpha is less than the angle beta. The vector diagrams S and R have been separated in Figure 6, because the frequencies *fs* and *fr* are different, which implies that one diagram rotates as a whole with respect to the other with an angular frequency omega, where two-pi-omega is equal to *fr*—*fs*.

The voltage V1 generated across the resistance 10 is, as before, the vector sum of V1*s* and V1*r*, and the voltage V2 generated across the resistance 11 is the vector sum of V2*s* and V2*r*, but in this case by reason of the rotation of the diagram S with respect to the diagram R, the vectors V1 and V2 fluctuate in amplitude the fluctuation frequency being the beat frequency of *fr* and *fs*. However it is evident that the mean value of V2 is greater than the mean value of V1 so that the control voltage derived from the network 15 has the polarity required to cause the frequency of the oscillator to increase whereby *fs* converges on *fd*.

When this pull-in action reaches the stage at which *fr*—*fd* is equal to *fd*—*fs*, the inclinations of V*os* and V*or* to V*ps* and V*pr* respectively (Figure 6) will be equal and opposite. In that case V1*r* is equal to V1*s* and V2*s* is equal to V2*r*, but the mean of V2 remains greater than the mean of V1 and the pull-in action will continue in the correct sense.

Similarly, it can be shown that when *fr*—*fd* becomes greater than *fd*—*fs*, V2*r* becomes greater than V2*s* and V1*s* becomes greater than V1*r* but V2 remains greater than V1 so that the control voltage from the network 15 has the correct sense to continue to increase the frequency *fs*. The pull-in action thus continues, with V1*s* increasing until it becomes equal to V2*r*. Since E*s* and E*r* are applied to the same discriminator, this only happens when *fs* and *fr* are "off-time" equally in the same sense, that is when *fs* is equal to *fr*. The frequency control proceeds no further, because if *fs* increased any further, V1*s* would exceed V1*r* and the sense of control would become reversed.

In the last stages of pull-in, when the beat is not completely smoothed, being within the noise bandwidth of the loop, the phase controlling action, depicted in Figure 4, also develops powerful control voltage which assists the pull-in. Finally the circuit locks with *fs* equal to *fr*, so that the frequency control voltage is zero, and with a sufficient phase error to generate the required control necessary to move *fs* from its initial value to *fr*. This phase error can be made negligibly small, by having sufficient gain in the control loop.

An important feature of the circuit is that should the frequency of the applied signals differ from the resonant frequency of the circuit 6, 7 but yet have the same frequency as each other, the output of the discriminator remains zero since the out-of-balance signal produced by the discriminator in response to one of the applied signals cancels that due to the other applied signal. However whether or not the applied signals have the same frequency as the tuned circuit 6, 7 the discriminator functions as a frequency discriminator if the frequency of E*s* differs from the frequency of E*r* and the discriminator generates a control voltage having a magnitude and a polarity dependent on the frequency differences. The voltage may be smoothed as indicated since the frequency discrimination no longer depends on the production of beat voltages between the two signals, as when known phase discriminators are used in conventional feedback circuits.

Obviously a wide variety of circuits may be used for comparing the resultant voltages V1 and V2.

The above description assumes that applied signals are in the form of sinusoidal oscillations, but the circuit can be employed with input signals having other waveforms, by arranging for the selectivity of the circuit to remove unwanted frequencies. Moreover the two signals may be fed into the discriminator in other ways for example by adding the primary voltages with the like polarities and inducing secondary voltage with opposite polarities. The two signals E*r* and E*s* are applied across the circuit 6, 7 which, being a reactive network, produces phase shifts dependent on the frequency of applied signals, and the invention depends on applying the signals E*r* and E*s* in push-push to the ends of the reactive network. The signals are applied moreover in such a way that one of the signals, which is Es in the example described, is applied in push-push to the end points of the re-active network with the same polarity as that with which it is applied across the network, whereas the other signal is applied in push-push to the ends of the reactive network with a polarity which is the reverse of that with which it is applied across the network. The difference signals as applied to the network have also substantially the same amplitude. As a result, when the frequencies of the signals Er and Es are the same the control signal is not altered even if said frequency differs from that for which the reactive circuit is designed, the out-of-balance effect due to the one signal, say Er, cancelling that due to the other.

The invention is not confined in its application to flywheel scanning circuits or to synchronised detectors for chrominance signals. It can also be employed for example for synchronising purposes in single sideband receivers and in frequency and phase lock circuits such as are employed for locking pulse generators to mains frequency.

The network 15 may be arranged either to smooth the voltages generated across the resistors 10 and 11 before differencing occurs or after differencing occurs. Alternatively, the network 15 may be dispensed with in some cases, if the rectifiers 8 and 9 are arranged as peak rectifiers.

What I claim is:

1. A circuit arrangement for comparing the frequencies or phases of two signals comprising a network for producing frequency dependent phase shift, means for applying the first of said signals with a first polarity to a first point of said network with reference to a second point of said network, means for applying the other signal with a second polarity to said first point with reference to said second point, means for applying said first signal with said first polarity in push-push to said two points, means for applying the second signal with the reverse of said second polarity in push-push to said two points, and means for deriving an output signal in response to the resultant voltage difference between said points, whereby the magnitude and sign of said output signal represents the frequency or phase difference of said two signals.

2. A circuit arrangement for comparing the frequencies or phases of two signals comprising a network for producing frequency dependent phase shift, means for applying the first of said signals with a first polarity to a first point of said network with reference to a second point of said network, means for applying the other signal with a second polarity to said first point with reference to said second point, means for applying said first signal with said first polarity in push-push to said two points, means for applying the second signals with the reverse of said second polarity in push-push to said two points, said signal applying means being predetermined to apply both signals with substantially the same amplitude, and means for deriving an output signal in response to the resultant voltage difference between said points, whereby the magnitude and sign of said output signal represents the frequency or phase difference of said two signals.

3. A circuit arrangement according to claim 1, said network comprising a parallel resonant circuit earthed at an intermediate point, and said first and second points being symmetrical with respect to said intermediate point.

4. A circuit arrangement according to claim 1, said means for deriving an output signal comprising means for deriving a signal responsive to the difference between the mean resultant voltages at said two points.

5. A circuit arrangement according to claim 1, comprising means for varying the frequency and phase of one of said two signals so as to tend to synchronise said one signal with the other signal.

6. A circuit arrangement for comparing the frequencies or phases of two signals comprising a parallel resonant circuit including an inductor earthed at its mid point, means magnetically coupled to said inductor for applying the first of said signals with a first polarity across said inductor, means magnetically coupled to said inductor for applying the other signal with a second polarity across said inductor, means for applying said first signal with said first polarity in push-push to the ends said inductor, means for applying said other signal with the reverse of said second polarity in push-push to the ends of said inductor, and means for deriving an output voltage in response to the resultant voltage across said resonant circuit, whereby said output signal varies in magnitude and sign in dependence upon the frequency and phase difference of said two signals.

7. A circuit arrangement according to claim 6 comprising means responsive to said output signal for varying the frequency and phase of one of said two signals so as to synchronise said one signal with the other signal, said signal applying means being predetermined to render said first and second polarities the same when the signals are synchronised.

8. A circuit arrangement for comparing the frequencies or phases of two signals comprising a parallel resonant circuit including an inductor earthed at its mid point, means magnetically coupled to said inductor for applying the first of said signals with a first polarity across said inductor, means magnetically coupled to said inductor for applying the other signal with a second polarity across said inductor, means for applying said first signal with said first polarity in push-push to the ends of said inductor, means for applying said other signal with the reverse of said second polarity in push-push to the ends of said inductor, said signal applying means being predetermined to apply both signals with substantially the same amplitude, and means for deriving an output voltage in response to the resultant voltage across said resonant circuit, whereby said output signal varies in magnitude and sign in dependence upon the frequency and phase difference of said two signals.

9. A circuit arrangement according to claim 6, said means for deriving an output signal comprising means for individually rectifying and smoothing the resultant voltages produced at the ends of said inductor.

References Cited in the file of this patent

UNITED STATES PATENTS 2,704,815 Guiles ---------------- Mar. 22, 1955